United States Patent
Bao et al.

(10) Patent No.: US 11,770,871 B2
(45) Date of Patent: Sep. 26, 2023

(54) RADIO LINK RECOVERY METHOD AND TERMINAL

(71) Applicant: VIVO MOBILE COMMUNICATION CO., LTD., Guangdong (CN)

(72) Inventors: Wei Bao, Dongguan (CN); Xiaodong Yang, Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 0 days.

(21) Appl. No.: 17/088,486

(22) Filed: Nov. 3, 2020

(65) Prior Publication Data

US 2021/0051755 A1 Feb. 18, 2021

Related U.S. Application Data

(63) Continuation of application No. PCT/CN2019/084763, filed on Apr. 28, 2019.

(30) Foreign Application Priority Data

May 4, 2018 (CN) .......................... 201810422250.2

(51) Int. Cl.
*H04W 24/10* (2009.01)
*H04W 76/19* (2018.01)
*H04W 74/08* (2009.01)

(52) U.S. Cl.
CPC ........... *H04W 76/19* (2018.02); *H04W 24/10* (2013.01)

(58) Field of Classification Search
None
See application file for complete search history.

(56) References Cited

U.S. PATENT DOCUMENTS

| | | | |
|---|---|---|---|
| 2011/0039552 A1* | 2/2011 | Narasimha | H04W 76/19 455/425 |
| 2013/0051214 A1 | 2/2013 | Fong et al. | |
| 2015/0045035 A1* | 2/2015 | Nigam | H04W 72/1268 455/436 |
| 2015/0173047 A1 | 6/2015 | Yamada | |
| 2015/0223282 A1 | 8/2015 | Vajaypeyam et al. | |
| 2016/0183321 A1 | 6/2016 | Wen et al. | |
| 2016/0261396 A1 | 9/2016 | Jeong et al. | |
| 2018/0269962 A1* | 9/2018 | Liu | H04W 72/082 |

(Continued)

FOREIGN PATENT DOCUMENTS

| | | |
|---|---|---|
| CN | 102845122 A | 12/2012 |
| CN | 103945408 A | 7/2014 |

(Continued)

OTHER PUBLICATIONS

Qualcomm Incorporated, Considerations of RLM/RLF and Beam Recovery in NR, 3GPP TSG-RAN WG2 Meeting #98, R2-1705089, Hangzhou, China, May 15-19, 2017.

(Continued)

*Primary Examiner* — Scott M Sciacca
(74) *Attorney, Agent, or Firm* — Maschoff Brennan

(57) ABSTRACT

A radio link recovery method and a terminal are provided in the present disclosure. The method includes: performing RLM; and when RLF is detected on a plurality of specified cells, initiating a radio link recovery procedure, and/or when RLF is detected on a specified cell, performing RLF reporting for the specified cell.

20 Claims, 4 Drawing Sheets

(56) References Cited

U.S. PATENT DOCUMENTS

| | | | |
|---|---|---|---|
| 2018/0359766 A1* | 12/2018 | Shih | H04W 72/1284 |
| 2019/0037630 A1* | 1/2019 | Zhang | H04W 88/16 |
| 2019/0253986 A1* | 8/2019 | Jeon | H04B 7/0695 |
| 2021/0185713 A1* | 6/2021 | Dinan | H04W 72/1268 |

FOREIGN PATENT DOCUMENTS

| | | | | |
|---|---|---|---|---|
| CN | 104349361 A | | 2/2015 | |
| CN | 105814957 A | | 7/2016 | |
| CN | 105960772 A | | 9/2016 | |
| EP | 2317686 A1 | * | 5/2011 | ............ H04L 5/003 |
| WO | 2017/105813 A1 | | 6/2017 | |
| WO | 2017/136666 A1 | | 8/2017 | |
| WO | 2017/173612 A1 | | 10/2017 | |
| WO | 2017/197264 A | | 11/2017 | |

OTHER PUBLICATIONS

Mediatek Inc., Qualcomm Incorporated, RLM/RLF Considering Beam Failure Recovery, 3GPP TSG-RAN WG2 #99-bis, R2-1710881, Prague, Czech, Oct. 9-13, 2017.

Chinese Office Action issued in corresponding application No. 201810422250.2, dated Apr. 14, 2020.

International Search Report and Written Opinion issued in corresponding application No. PCT/CN2019/084763, dated Nov. 19, 2020.

ZTE, "Radio link failure trigger in a carrier aggregation,"3GPP TSG RAN WG2 #67, R2-094705, pp. 1-2, (Aug. 18, 2009).

ZTE, "RLF and Re-establishment in carrier aggregation,"3GPP TSG RAN WG2 #67bis, R2-095669, pp. 1-4, (Oct. 12, 2009).

3GPP TS 38.331, "Technical Specification Group Radio Access Network," 3rd Generation Partnership Project, pp. 1-268, (Mar. 2018).

Extended European Search Report dated May 25, 2021 as received in Application No. 19796350.7.

Interdigital Communications, RLF and Recovery Procedures for NR, R2-1702876, 3GPP TSG-RAN WG2 #97bis, Spokane, USA, Apr. 3-7, 2017.

European Office Action issued in corresponding application No. 19796350.7, dated Apr. 12, 2023.

* cited by examiner ly process, method, system, product, or device. In addition, "and/or" in this specification represents at least one of connected objects.

RADIO LINK RECOVERY METHOD AND TERMINAL

CROSS-REFERENCE TO RELATED APPLICATIONS

This application is a continuation application of International Application No. PCT/CN2019/084763 filed on Apr. 28, 2019, which claims priority to Chinese Patent Application No. 201810422250.2, filed in China on May 4, 2018, both disclosures of which are incorporated herein by reference in their entireties.

TECHNICAL FIELD

This disclosure relates to the field of communications technologies, and in particular, to a radio link recovery method and a terminal.

BACKGROUND

In a communications system, a terminal may establish connectivity to one or more base stations, for example, single connectivity, dual connectivity, or multi-connectivity. In a single-connectivity scenario, a terminal establishes connectivity to one base station, but the base station may have a plurality of cells. In a dual-connectivity scenario, a terminal may establish connectivity to two base stations. In a multi-connectivity scenario, a terminal may establish connectivity to more than two base stations. However, in a radio link monitoring (Radio Link Monitoring, RLM) mechanism, RLM and radio link failure (Radio Link Failure, RLF) determining are performed only based on a single cell. After RLF is determined, a corresponding radio link recovery procedure is initiated and performed. In the single-connectivity scenario, the cell is a primary cell (Primary Cell, PCell). In the dual-connectivity or multi-connectivity scenario, the cell is a primary cell (Primary Cell, PCell) or a primary secondary cell (Primary Secondary Cell, PSCell). However, in a new radio (New Radio, NR) system, a high band is used for communication, and propagation of a high-band signal has characteristics that make the signal prone to be blocked. As a result, a terminal frequently determines that RLF has occurred, and frequently performs corresponding radio link recovery procedures. Consequently, data transmission of the terminal is frequently interrupted, and communication performance of the terminal is comparatively low.

SUMMARY

Some embodiments of this disclosure provide a radio link recovery method and a terminal, to resolve a problem that communication performance of a terminal is comparatively low.

According to a first aspect, some embodiments of this disclosure provide a radio link recovery method, where the method is applied to a terminal and includes:

performing RLM; and when radio link failure RLF is detected on a plurality of specified cells, initiating a radio link recovery procedure, and/or when RLF is detected on a specified cell, performing RLF reporting for the specified cell.

According to a second aspect, some embodiments of this disclosure provide a terminal, including:

a monitoring module, configured to perform RLM; and an execution module, configured to: when radio link failure RLF is detected on a plurality of specified cells, initiate a radio link recovery procedure, and/or when RLF is detected on a specified cell, perform RLF reporting for the specified cell.

According to a third aspect, some embodiments of this disclosure provide a terminal, including: a memory, a processor, and a computer program that is stored in the memory and capable of running on the processor, where when the computer program is executed by the processor, the steps of the radio link recovery method provided in some embodiments of this disclosure are implemented.

According to a fourth aspect, some embodiments of this disclosure provide a computer-readable storage medium, where the computer-readable storage medium stores a computer program, and when the computer program is executed by a processor, the steps of the radio link recovery method provided in some embodiments of this disclosure are implemented.

In some embodiments of this disclosure, RLM is performed; and when radio link failure RLF is detected on a plurality of specified cells, a radio link recovery procedure is initiated, and/or when RLF is detected on a specified cell, RLF reporting is performed for the specified cell. In this way, in comparison with the related technology in which a radio link recovery procedure is initiated after a single cell has encountered RLF, communication performance of a terminal can be improved in some embodiments of this disclosure.

DESCRIPTION OF EMBODIMENTS

The following clearly describes the technical solutions in some embodiments of this disclosure with reference to the accompanying drawings in some embodiments of this disclosure. Apparently, the described embodiments are merely some rather than all of the embodiments of this disclosure. Based on the embodiments of this disclosure, all other embodiments derived by a person of ordinary skill in the art without creative efforts fall within the protection scope of this disclosure.

In the specification and the claims of this application, the terms "include" and "comprise" and any of their variants are intended to cover a non-exclusive inclusion. For example, a process, a method, a system, a product, or a device that includes a list of steps or units is not necessarily limited to those expressly listed steps or units, but may include other steps or units that are not expressly listed, or inherent to such process, method, product, or device. In addition, in the specification and the claims, "and/or" indicates at least one of the connected objects. For example, A and/or B indicates three cases: A alone, B alone, and both A and B.

In some embodiments of this disclosure, the term "illustrative", "for example", or the like is used to indicate an example, an illustration, or an explanation. In some embodiments of this disclosure, any embodiment or design solution described by using "illustrative" or "for example" should not be construed as being more preferred or more advantageous than other embodiments or design solutions. Precisely, the term "illustrative", "for example", or the like is intended to present a related concept in a specific manner.

The following describes the embodiments of this disclosure with reference to the accompanying drawings. The radio link recovery method and the terminal provided in some embodiments of this disclosure may be applied to a wireless communications system. The wireless communications system may be a 5G system, an evolved long term evolution (Evolved Long Term Evolution, eLTE) system, or a later evolved communications system.

Figure 1:
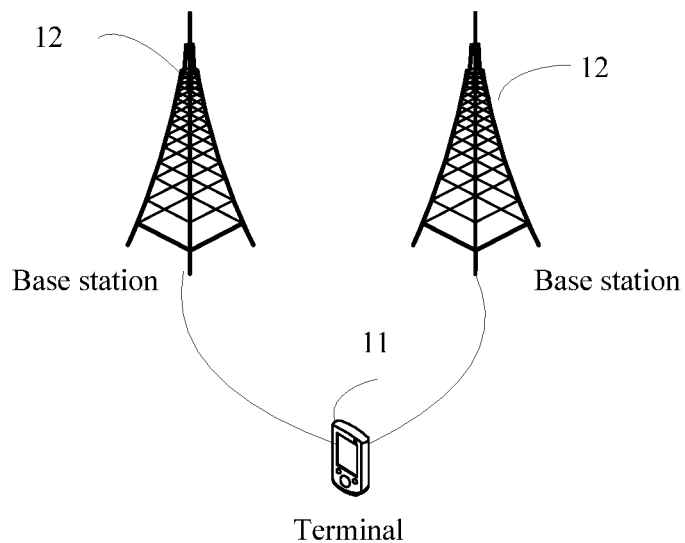
FIG. 1 is a structural diagram of a network system to which some embodiments of this disclosure may be applied.

FIG. 1 is a structural diagram of a network system to which some embodiments of this disclosure may be applied. As shown in FIG. 1, the network system includes a terminal 11 and at least one base station 12. The terminal 11 may be user equipment (User Equipment, UE) or other terminal side devices, for example, a terminal side device such as a mobile phone, a tablet personal computer (Tablet Personal Computer), a laptop computer (Laptop Computer), a personal digital assistant (personal digital assistant, PDA for short), a mobile internet device (Mobile Internet Device, MID), or a wearable device (Wearable Device). It should be noted that the terminal 11 is not limited to any specific type in the embodiments of this disclosure. The base station 12 may be a 4G base station, a 5G base station, a base station of a later version, or a base station in other communications systems, or may be referred to as a NodeB, an evolved NodeB, or other terms in the field. Provided that a same technical effect is achieved, the base station is not limited to a specific technical term. In addition, the base station 12 may be a master base station (Master Node, MN) or a secondary base station (Secondary Node, SN). It should be noted that, in some embodiments of this disclosure, the 5G base station is used as only an example, but the base station is not limited to any specific type.

Figure 2:
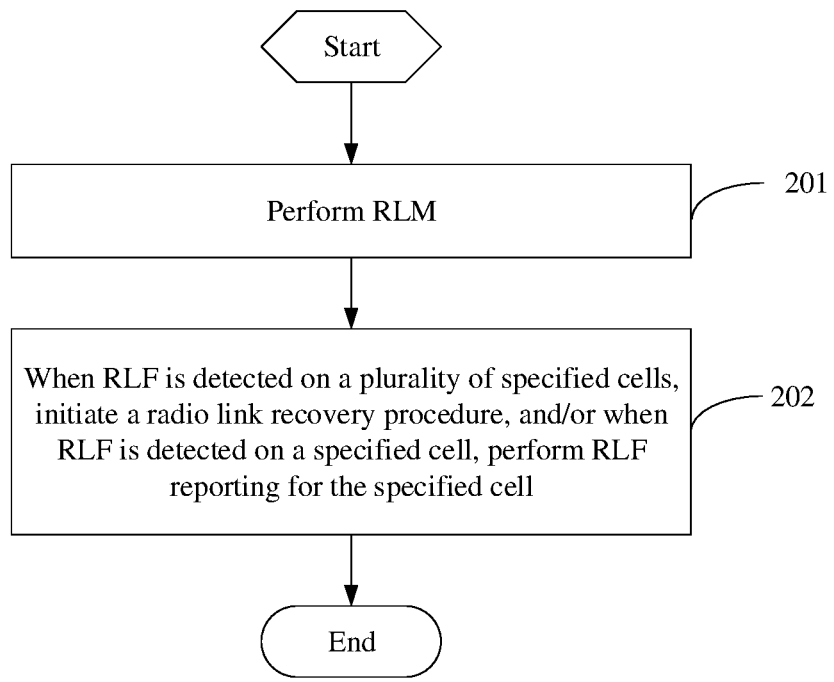
FIG. 2 is a flowchart of a radio link recovery method according to some embodiments of this disclosure.

FIG. 2 is a flowchart of a radio link recovery method according to some embodiments of this disclosure. The method is applied to a terminal. As shown in FIG. 2, the method includes the following steps.

Step 201: Perform RLM.

This step may be performing RLM on a plurality of specified cells, and determining, through RLM, whether the specified cells have encountered RLF.

In some embodiments of this disclosure, one serving base station may have one or more specified cells (which may also be referred to as specific cells). In addition, a specified cell of a serving base station may be configured by the base station, or may be defined in a protocol. For example, the protocol may predefine a PCell, a PSCell, and/or a physical uplink control channel (Physical Uplink Control Channel, PUCCH) SCell as the specified cell. The PUCCH SCell may mean that a secondary cell of a PUCCH is configured for the UE.

It should be noted that, in some embodiments of this disclosure, a manner of determining, through RLM, that a cell has encountered RLF is not limited. The following describes a manner of determining that a cell has encountered RLF as an example.

Performing RLM on a specified cell may be measuring a signal to interference plus noise ratio (Signal to Interference plus Noise Ratio, SINR) of a cell-specific reference signal (Cell Reference Signal, CRS) corresponding to a physical downlink control channel (Physical Downlink Control Channel, PDCCH) of the specified cell. When a physical layer (L1) of the terminal learns, through measurement, that the SINR of the CRS corresponding to the PDCCH of the specified cell is less than a specific threshold, it is considered that the radio link is out of synchronization (out-of-sync). The physical layer notifies an out-of-sync indication to a higher layer (for example, an RRC layer, L3). If the RRC layer consecutively receives N310 (N310 is a preconfigured value, for example, 3, 5, or 10) out-of-sync indications, the RRC layer of the terminal starts a timer T310. After T310 is started, if the CRS corresponding to the PDCCH of the specified cell is greater than the specific threshold as measured by the physical layer, it is considered that the radio link is in synchronization (in-sync). In this case, the physical layer notifies an in-sync indication to the higher layer (the RRC layer). If the RRC layer consecutively receives N311 (N311 is another preconfigured value, for example, 2, 6, or 10) in-sync indications, the terminal stops the timer T310 from running. If the timer T310 expires, the terminal determines that the specified cell has encountered RLF.

Certainly, in some embodiments of this disclosure, an RLM and RLF mechanism in an LTE system may alternatively be used for determining whether a cell has encountered RLF.

Step 202: When RLF is detected on a plurality of specified cells, initiate a radio link recovery procedure, and/or when RLF is detected on a specified cell, perform RLF reporting for the specified cell.

In this step, the plurality of specified cells may be a plurality of specified cells of different serving base stations. For example, in a dual-connectivity scenario, when RLF is detected on a specified cell of a master base station and RLF is detected on a specified cell of a secondary base station, a radio link recovery procedure may be initiated. Alternatively, the plurality of specified cells may be a plurality of specified cells of a same base station. For example, in a single-connectivity scenario, if a plurality of specified cells of a serving base station have encountered RLF, a radio link recovery procedure may be initiated.

In the foregoing step, the radio link recovery procedure is initiated only when RLF is detected on the plurality of specified cells. This can prevent the terminal from frequently performing radio link recovery procedures, to reduce frequency of data transmission interruption of the terminal, and therefore improve communication performance of the terminal. In addition, when RLF is detected on the plurality of specified cells, the terminal may determine occurrence of terminal RLF (or referred to as a UE RLF) or cell group RLF, and initiate the radio link recovery procedure. This can prevent the terminal from frequently encountering UE RLF or cell group RLF. The cell group RLF may be secondary cell group (Secondary Cell Group, SCG) RLF or master cell group (Master Cell Group, MCG) RLF.

In addition, in some embodiments of this disclosure, a case in which there are not a plurality of specified cells encountering RLF is not limited. For example, the terminal has two serving base stations, and each serving base station has one specified cell. In this case, if a specified cell of one of the serving base stations has not encountered RLF, step 201 may continue to be performed, or the procedure is ended.

The when RLF is detected on a specified cell, performing RLF reporting for the specified cell may be: when RLF is detected on one specified cell, performing RLF reporting for the specified cell, for example, reporting that the specified cell or a serving base station of the specified cell has encountered RLF; or when RLF is detected on a plurality of specified cells (for example, all specified cells) of a serving base station, performing RLF reporting for the specified cells, for example, reporting that the serving base station of the specified cells has encountered RLF. Compared with the related technology in which a radio link recovery procedure is initiated provided that RLF is detected on a cell, in some embodiments of this disclosure, this can prevent the terminal from frequently performing radio link recovery procedures, to reduce frequency of data transmission interruption of the terminal, and therefore improve communication performance of the terminal.

In addition, after RLF reporting is performed for the specified cell (for example, after it is reported that the specified cell or a serving base station of the specified cell has encountered RLF), a network side may remove the specified cell or the serving base station from a cell list or a base station list of the terminal, to prevent the terminal from continuing to perform receiving and sending in the specified cell or a cell of the serving base station, so as to reduce power consumption of the terminal. In addition, this can further prevent the serving base station from continuing to schedule data transmission of the terminal, or prevent the serving base station from continuing to schedule data transmission of the terminal in the specified cell, thereby reducing interference and improving resource utilization. Certainly, the network side may further configure a new serving base station or cell for the terminal, to increase a throughput of the terminal.

It should be noted that "and/or" in step 202 indicates that step 202 may include the following three cases:

when radio link failure RLF is detected on a plurality of specified cells, initiating a radio link recovery procedure; or when RLF is detected on a specified cell, performing RLF reporting for the specified cell; or when radio link failure RLF is detected on a plurality of specified cells, initiating a radio link recovery procedure, and when RLF is detected on a specified cell, performing RLF reporting for the specified cell.

It should be noted that the foregoing method provided in some embodiments of this disclosure may be applied to a 5G NR system. However, this is not limited. Provided that an essentially same function can be implemented, the method is applicable to other communications systems. For example, the method may be applied to 4G or 6G systems or other communications systems in which a radio link recovery procedure is applied.

In some embodiments of this disclosure, RLM is performed; and when radio link failure RLF is detected on a plurality of specified cells, a radio link recovery procedure is initiated, and/or when RLF is detected on a specified cell, RLF reporting is performed for the specified cell. In this way, compared with the related technology in which a radio link recovery procedure is initiated after a single cell has encountered RLF, communication performance of a terminal can be improved in the embodiments of this disclosure.

Figure 3:
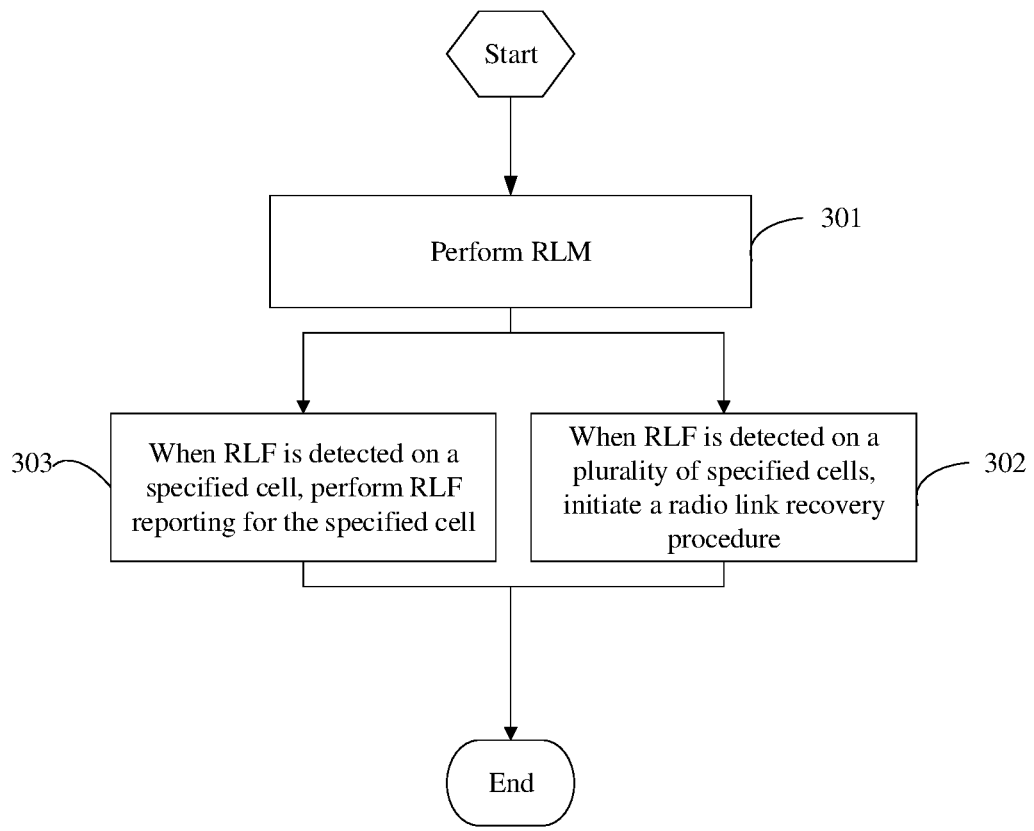
FIG. 3 is a flowchart of another example of a radio link recovery method according to some embodiments of this disclosure.

FIG. 3 is a flowchart of another example of a radio link recovery method according to some embodiments of this disclosure. The method is applied to a terminal. As shown in FIG. 3, the method includes the following steps.

Step 301: Perform RLM.

Step 302: When radio link failure RLF is detected on a plurality of specified cells, initiate a radio link recovery procedure.

In an optional implementation, the performing RLM includes:

when the terminal works in a dual-connectivity mode or a multi-connectivity mode, performing RLM on a specified cell of each serving base station; or when the terminal works in a single-connectivity mode, performing RLM on a plurality of specified cells of a serving base station.

This implementation allows RLM to be performed on a specified cell of each serving base station in the dual-connectivity mode or the multi-connectivity mode, to determine whether the specified cell has encountered RLF.

Because RLM is performed on the specified cell of each serving base station, when initiating a radio link recovery procedure, the terminal needs to consider signal strength of more serving base stations, to further prevent the terminal from frequently initiating radio link recovery procedures.

In addition, in the dual-connectivity mode or the multi-connectivity mode, each serving base station may have one or more specified cells, and different serving base stations may have a same quantity or different quantities of specified cells. This is not limited. For example, the performing RLM on a specified cell of each serving base station includes:

performing RLM on one specified cell of each serving base station; or performing RLM on a plurality of specified cells of each serving base station.

The performing RLM on one specified cell of each serving base station may implement that a radio link recovery procedure is initiated only when specified cells of a plurality of serving base station have encountered RLF, to further prevent the terminal from frequently initiating radio link recovery procedures. For example, in the dual-connectivity mode, a radio link recovery procedure is initiated only when a specified cell of a master base station and a specified cell of the secondary base station both have encountered RLF.

The performing RLM on a plurality of specified cells of each serving base station may be performed when each serving base station has a plurality of specified cells. In this way, whether to initiate a radio link recovery procedure can be determined based on RLF of more specified cells. For example, the master base station has two specified cells, and the secondary base station has two or three specified cells. In this case, a radio link recovery procedure is initiated only when at least one of the specified cells of the master base station has encountered RLF and at least one of the specified cells of the secondary base station has encountered RLF. Optionally, a radio link recovery procedure may be initiated only when all specified cells have encountered RLF.

In addition, in the foregoing implementation, it may be further implemented that RLM is performed on a plurality of specified cells of a serving base station in the single-connectivity mode. Therefore, it is implemented that a radio link recovery procedure is initiated only when a plurality or all of specified cells of the serving base stations have encountered RLF, to further prevent the terminal from frequently initiating radio link recovery procedures.

Optionally, in an implementation, the when RLF is detected on a plurality of specified cells, initiating a radio link recovery procedure includes:

when RLF is detected on specified cells of a plurality of serving base stations, initiating the radio link recovery procedure.

That RLF is detected on specified cells of a plurality of serving base stations may be that the plurality of serving base stations all have a specified cell on which RLF is detected. However, herein, it is not required that all specified cells of the plurality of serving base stations have encountered RLF. Because the radio link recovery procedure is initiated only when RLF is detected on the specified cells of the plurality of serving base stations, the terminal may be further prevented from frequently initiating radio link recovery procedures. Certainly, in an optional implementation, the radio link recovery procedure may be initiated only when all specified cells of a plurality or all of serving base stations have encountered RLF. This can make the terminal achieve better communication performance.

The terminal works in the dual-connectivity mode or the multi-connectivity mode, and the when RLF is detected on specified cells of a plurality of serving base stations, initiating the radio link recovery procedure may include:

if each serving base station has one specified cell, when RLF is detected on a plurality of specified cells, initiating the radio link recovery procedure; or if each serving base station has a plurality of specified cells, when RLF is detected on the plurality of specified cells of each serving base station, initiating the radio link recovery procedure.

When each serving base station has one specified cell, that RLF is detected on a plurality of specified cells may be that RLF is detected on specified cells of a plurality of serving base stations, because each serving base station is configured with one specified cell. Optionally, the radio link recovery procedure may be initiated only when it is detected that specified cells of all serving base stations have encountered RLF. This can avoid a case in which a connection between the UE and a network side is interrupted when a master serving base station (for example, an MN) PCell has encountered RLF even if signal quality of a secondary serving base station (for example, an SN) PSCell is still good, and can further make the terminal achieve better communication performance.

It should be noted that, when each serving base station is configured with a plurality of specified cells, that RLF is detected on a plurality of specified cells of each serving base station does not require that a quantity of specified cells of a serving base station that have encountered RLF be equal to a quantity of specified cells of the serving base station. For example, a serving base station has three specified cells, and when RLF is detected on two specified cells of the serving base station, it is considered that RLF is detected on a plurality of specified cells of the serving base station. Certainly, in some embodiments of this disclosure, optionally, the radio link recovery procedure is initiated only when all specified cells of each serving base station have encountered RLF. This can make the terminal achieve better communication performance.

Certainly, in some embodiments of this disclosure, there may be another scenario. For example, in the dual-connectivity mode or the multi-connectivity mode, some serving base stations have only one specified cell, and other serving base stations have a plurality of specified cells. In this case, the radio link recovery procedure may be initiated when RLF is detected on a specified cell of a serving base station having only one specified cell and RLF is detected on a plurality of specified cells of a serving base station having a plurality of specified cells. This can improve flexibility of the terminal, to adapt to different scenarios or service requirements.

Optionally, in another implementation, the when RLF is detected on a plurality of specified cells, initiating a radio link recovery procedure includes:

when RLF is detected on a plurality of specified cells of a master base station, initiating the radio link recovery procedure, where the master base station is a master base station in the dual-connectivity mode or the multi-connectivity mode, or the master base station is a serving base station in the single-connectivity mode.

This implementation allows the terminal to initiate a radio link recovery procedure once a plurality of specified cells of the master base station have encountered RLF. This makes it more flexible for the terminal to initiate radio link recovery procedures and can also prevent frequent initiation of radio link recovery procedures, so that communication performance of the terminal is better.

It should be noted that the when RLF is detected on a plurality of specified cells of a master serving base station, initiating the radio link recovery procedure may be: when all specified cells of the master serving base station have encountered RLF, initiating the radio link recovery procedure. Certainly, if the master serving base station has three or more specified cells, the radio link recovery procedure may alternatively be initiated when RLF is detected on two or more specified cells of the master serving base station. This is not limited.

Optionally, the when RLF is detected on a plurality of specified cells, initiating a radio link recovery procedure includes:

when RLF is detected on a plurality of specified cells, starting a timer;

during running of the timer, performing a cell selection process; and if a cell meeting a specific condition is selected, performing a radio resource control (Radio Resource Control, RRC) connection reestablishment process for the cell.

The timer may be configured by a network or defined in a protocol. This is not limited.

This implementation allows the RRC connection reestablishment process to be performed for the cell to recover a radio link during the running of the timer or when the cell meeting the specific condition is selected. This can increase a success rate of recovering the radio link. The cell meeting the specific condition may be obtained by finding an appropriate cell, for example, finding a cell with signal strength greater than a specific threshold, or finding a cell with channel quality meeting a specific condition. This is not limited. Certainly, the specific cell may be preconfigured by the terminal, or configured by the network, or predefined in a protocol, or the like.

Certainly, in some embodiments of this disclosure, the initiating a radio link recovery procedure is not limited to the foregoing manner of initiating. For example, the timer may alternatively not be started, and provided that an appropriate cell is found, an RRC connection reestablishment process is initiated for the cell.

Optionally, the method may further include the following step:

Step 303: When RLF is detected on a specified cell, perform RLF reporting for the specified cell.

The specified cell in step 303 may be one or more specified cells that have encountered RLF. In addition, in step 303, when RLF is detected on a specified cell, RLF reporting for the specified cell may be implemented in one or more other cells different from the specified cell. For example, if a first specified cell has encountered RLF, RLF reporting for the first specified cell may be implemented in one or more other cells that have not encountered RLF. This can increase a success rate of reporting.

It should be noted that, in this embodiment, a time sequence of step 303 and step 301 is not limited. For example, 303 may be selected after step 301, or step 303 may be performed in a process of performing step 301. A reason is that, in step 301, RLM may be performed on a plurality of specified cells, and specified cells of a plurality of serving base stations. In this way, a reporting condition may be met in a monitoring process, so that corresponding reporting may be performed in step 303. In addition, this embodiment may include at least one of step 302 and step 303. To be specific, an implementation may include only step 302 or step 303, and another implementation may include step 302 and step 303.

In an implementation, step 303 may include:

if each serving base station has one specified cell, when RLF is detected on a specified cell, reporting to the network side that a serving base station corresponding to the specified cell has encountered RLF.

The when RLF is detected on a specified cell, reporting to the network side that a serving base station corresponding to the specified cell has encountered RLF may be: when RLF is detected on a specified cell but there is still at least one serving base station having a specified cell that has not encountered RLF, reporting to the network side that a serving base station corresponding to the specified cell has encountered RLF. In this way, after it is reported that the serving base station has encountered RLF, the network side may remove the serving base station from a serving base station list of the terminal, to prevent the terminal from continuing to perform receiving and sending in a cell of the serving base station, so as to reduce power consumption of the terminal. In addition, this can further prevent the serving base station from continuing to schedule data transmission of the terminal, thereby reducing interference and improving resource utilization. Certainly, the network side may further configure a new serving base station for the terminal, to increase a throughput of the terminal.

In another implementation, step 303 may include:

if each serving base station has a plurality of specified cells, when RLF is detected on a first specified cell and a serving base station corresponding to the first specified cell still has a second specified cell that has not encountered RLF, reporting to the network side that the first specified cell has encountered RLF.

The first specified cell may be a specified cell of any serving base station. Likewise, the second specified cell may be a specified cell that is of the serving base station and that has not encountered RLF. In other words, when a specified cell of a serving base station has encountered RLF, if the serving base station further has at least one specified cell that has not encountered RLF, it is reported to the network side that the first specified cell has encountered RLF. In this way, after it is reported that the first specified cell has encountered RLF, the network side may remove the first specified cell from a serving cell list, to prevent the terminal from continuing to perform receiving and sending in the first specified cell, so as to reduce power consumption of the terminal. In addition, this can further prevent the serving base station of the first specified cell from continuing to schedule, in the cell, the terminal to transmit data, thereby reducing interference and improving resource utilization. Certainly, the network side may further configure a new cell for the terminal, to increase a throughput of the terminal.

In another implementation, step 303 may include:

when the terminal works in the dual-connectivity mode or the multi-connectivity mode, if each serving base station has a plurality of specified cells, when RLF is detected on a plurality of specified cells of a secondary base station, reporting to the network side that the secondary base station has encountered RLF.

This implementation allows reporting to the network side that the secondary base station has encountered RLF when RLF is detected on the plurality of specified cells of the secondary base station. For example, when all or some of specified cells (the some of specified cells are at least two specified cells) of the secondary base station have encountered RLF, it is reported to the network side that the secondary base station has encountered RLF. In this way, after it is reported that the secondary base station has encountered RLF, the network side may remove the secondary base station from a secondary base station list of the terminal, to prevent the terminal from continuing to perform receiving and sending in a cell of the secondary base station, so as to reduce power consumption of the terminal. In addition, this can further prevent the secondary base station from continuing to schedule data transmission of the terminal, thereby reducing interference and improving resource utilization. Certainly, the network side may further configure a new secondary base station for the terminal, to increase a throughput of the terminal. It should be noted that, in this implementation, when the plurality of specified cells of the secondary base station have encountered RLF, it is reported to the network side that the secondary base station has encountered RLF. Herein, it may not be considered whether there is still another serving base station having a specified cell that has not encountered RLF. To be specific, if the plurality of specified cells of the secondary base station have encountered RLF, regardless of whether there is still another serving base station having a specified cell that has not encountered RLF, the terminal may report to the network side that the secondary base station has encountered RLF.

In another implementation, step 303 may include:

when the terminal works in the dual-connectivity mode or the multi-connectivity mode, if each serving base station has a plurality of specified cells, when RLF is detected on a plurality of specified cells of a first serving base station and there is still a second serving base station having a specified cell that has not encountered RLF, reporting to the network side that the first serving base station has encountered RLF.

The first serving base station may be a master base station or a secondary base station. This implementation allows the terminal to report to the network side, if it is detected that a plurality of specified cells of a first serving base station have encountered RLF, and there is still a serving base station having a specified cell that has not encountered RLF, that the first serving base station has encountered RLF. For beneficial effects of this implementation, refer to the foregoing beneficial effects of reporting that a serving base station has encountered RLF. Details are not described herein again.

In another implementation, step 303 may include:

when RLF is detected on a specified cell, reporting, in one or more other cells different from the specified cell, to the network side that the specified cell or a serving base station of the specified cell has encountered RLF.

This implementation allows RLF reporting for a cell to be performed in another cell when the cell encounters RLF. This can increase a success rate of reporting. In addition, in this implementation, for the reporting to the network side that the specified cell or a serving base station of the specified cell has encountered RLF, refer to the foregoing four cases of reporting that a cell or a base station has encountered RLF. For example, if each serving base station has one specified cell, when RLF is detected on a first specified cell, it is reported, in a second specified cell, to the network side that a serving base station corresponding to the first specified cell has encountered RLF; or if each serving base station has a plurality of specified cells, when RLF is detected on a first specified cell and a serving base station corresponding to the first specified cell still has a second specified cell that has not encountered RLF, it is reported, in the second specified cell or a cell of another serving base station, to the network side that the first specified cell has encountered RLF; or when the terminal works in the dual-connectivity mode or the multi-connectivity mode, if each serving base station has a plurality of specified cells, when RLF is detected on a plurality of specified cells of a first secondary base station, it is reported, in a cell of a second secondary base station or a master base station, to the network side that the first secondary base station has encountered RLF; or when the terminal works in the dual-connectivity mode or the multi-connectivity mode, if each serving base station has a plurality of specified cells, when RLF is detected on a plurality of specified cells of a first serving base station and there is still a second serving base station having a specified cell that has not encountered RLF, it is reported, in a cell of the second serving base station or another serving base station, to the network side that the first serving base station has encountered RLF.

Optionally, in the foregoing plurality of implementations, the terminal reports, to the network side by using a configured scheduling request (Scheduling Request, SR) resource, that a specified cell or a serving base station has encountered RLF; or the terminal reports, to the network side by using a configured random access channel (Random Access Channel, RACH) resource, that a specified cell or a serving base station has encountered RLF.

The terminal may be configured with the SR resource or the RACH resource in advance. The configuration may be being configured by the network or being predefined in a protocol. This implementation allows reporting to the network side by using the SR resource or the RACH resource that the specified cell or the serving base station has encountered RLF, without configuring any additional resource, to improve resource utilization.

Optionally, the terminal is configured with a mapping relationship between SR resources or RACH resources and specified cells, where one specified cell corresponds to one or more SR resources, or one specified cell corresponds to one or more RACH resources; and/or the terminal is configured with a mapping relationship between SR resources or RACH resources and serving base stations, where one serving base station corresponds to one or more SR resources, or one serving base station corresponds to one or more RACH resources; and the terminal reports, by using one or more of SR resources corresponding to a specified cell, that the specified cell has encountered RLF; or the terminal reports, by using one or more of RACH resources corresponding to a specified cell, that the specified cell has encountered RLF; or the terminal reports, by using one or more of SR resources corresponding to a serving base station, that the serving base station has encountered RLF; or the terminal reports, by using one or more of RACH resources corresponding to a serving base station, that the serving base station has encountered RLF.

The mapping relationship between SR resources or RACH resources and specified cells, and the mapping relationship between SR resources or RACH resources and serving base stations may be one-to-one mapping relationships or one-to-many mapping relationships. To be specific, one or more SR resources or RACH resources may be configured for each specified cell, or one or more SR resources or RACH resources may be configured for each base station. Certainly, each specified cell or base station may be configured with a same or different quantity of SR resources or RACH resources. This is not limited.

In addition, the reporting, by using one or more of SR resources corresponding to a specified cell, that the specified cell has encountered RLF may be: reporting, by using one or more of all SR resources corresponding to the specified cell, that the specified cell has encountered RLF. For example, if a specified cell is configured with three SR resources, one, two, or three of the three SR resources may be used for reporting. In addition, there may be a plurality of implementations of selecting a resource for reporting from a plurality of SR resources or a plurality of RACH resources. For example, a resource that arrives first is used first, or a resource with better signal quality is preferentially used, or a plurality of resources are used together, or a resource is used after another resource fails. This is not limited.

This implementation allows the terminal to, when the terminal needs to report RLF of a cell or RLF of a base station, perform the reporting by using an SR resource or a RACH resource corresponding to the cell or the base station, so that the network side more easily determines the cell or the base station that has encountered RLF, to improve network working efficiency. In addition, reporting by using an SR resource or a RACH resource may be: sending a corresponding SR or RACH, to report to the network side that a specified cell or a base station has encountered RLF.

In an optional implementation, the plurality of specified cells include a specified cell corresponding to PUCCHs of a plurality of cells, and the terminal reports channel quality indicator (Channel Quality Indicator, CQI) information of the specified cell by using at least one of the PUCCHs of the plurality of cells corresponding to the specified cell.

The specified cell corresponding to the PUCCHs of the plurality of cells may mean that the CQI information of the specified cell may be carried on the PUCCHs of the plurality of cells for transmission. If a plurality of the PUCCHs of the plurality of cells are used to transmit CQI information, the CQI information transmitted on the plurality of PUCCHs is the same. That is, redundancy backup transmission is implemented, and the plurality of PUCCHs use resources of a plurality of cells for transmission. In this implementation, redundancy reporting ensures reception of the CQI information by the network, so that the network can discover downlink quality deterioration in a timely manner. In addition, in this implementation, the specified cell corresponds to the PUCCHs of the plurality of cells, where the plurality of cells include the specified cell and another cell.

In addition, the CQI information may reflect downlink quality of the cell. The reporting, by the terminal, CQI information of the specified cell by using at least one of the PUCCHs of the plurality of cells corresponding to the specified cell may be as follows: The terminal may report the CQI information of the specified cell by using a PUCCH of one or more of the plurality of cells.

This implementation allows configuration of a plurality of PUCCHs for a same specified cell while the plurality of PUCCHs belong to different cells. For example, the terminal is configured with two specified cells (which may belong to one or more base stations) for performing RLM, for example, a cell 1 and a cell 2. In this way, the terminal may be configured to transmit CQI information of the cell 1 and the cell 2 on a PUCCH of the cell 1, and also configured to transmit the CQI information of the cell 1 and the cell 2 on a PUCCH of the cell 2. Therefore, the terminal may transmit the CQI information of the cell 1 and the cell 2 on the PUCCH of the cell 1, and may transmit the CQI information of the cell 1 and the cell 2 on the PUCCH of the cell 2. This can avoid that the network cannot receive a CQI reported in a cell when signal quality of the cell is poor. In this implementation, redundancy reporting ensures reception of the CQI information by the network, so that the network can discover downlink quality deterioration in a timely manner.

In an optional implementation, after the performing RLM, the method further includes:

when a specified cell encounters beam failure, reporting, by using a RACH resource of another specified cell, a notification message indicating that the specified cell has encountered beam failure; and if a quantity of reporting times of reporting the notification message indicating that the specified cell has encountered beam failure reaches a preset maximum quantity of times and the reporting is still not successful, initiating a radio link recovery procedure.

The specified cell may be any specified cell that has encountered beam failure (Beam failure), and the another specified cell may be a specified cell that is selected by the terminal and that has better or best channel quality, so that beam failure is reported by using the specified cell with better or best channel quality. Optionally, a plurality of specified cells are configured with RACH resources, and the another specified cell is a specified cell selected by the terminal from the plurality of specified cells that are configured with RACH resources, for example, a specified cell with better or best channel quality is selected from the plurality of specified cells. This can implement that the terminal selects a specified cell with good signal quality for reporting when beam failure occurs, thereby reducing a probability that reporting is still not successful when RACH attempts reach a maximum quantity of times.

In addition, the if a quantity of reporting times of reporting the notification message indicating that the specified cell has encountered beam failure reaches a preset maximum quantity of times and the reporting is still not successful, initiating a radio link recovery procedure may be as follows: The reporting the notification message indicating that the specified cell has encountered beam failure reaches the preset maximum quantity of times but the reporting is still not successful, so that the terminal may determine a UE RLF and further initiate the radio link recovery procedure. This can prevent the terminal from frequently performing radio link recovery procedures, to reduce frequency of data transmission interruption of the terminal, and therefore improve communication performance of the terminal. The preset maximum quantity of times may be preconfigured by the terminal, or predefined in a protocol, or preconfigured by the network, or the like.

In addition, this implementation allows the terminal to initiate a radio link recovery procedure in two cases, where one is the case in step 302, and the other is the case provided in this implementation, to improve flexibility of initiating a radio link recovery procedure by the terminal. It should be noted that, for the radio link recovery procedure initiated in this implementation, reference may be made to the radio link recovery procedure initiated in step 302. Details are not described herein again.

In this embodiment, a plurality of optional implementations are added based on the embodiment shown in FIG. 2, and can all improve communication performance of the terminal, and further achieve beneficial effects such as reducing power consumption of the terminal and improving resource utilization.

The following describes the radio link recovery method provided in some embodiments of this disclosure by using a plurality of embodiments as examples.

Example 1

UE is configured to work in a multi/dual-connectivity mode: one MN and X SNs. When X=1, dual connectivity is used. When X>1, multi-connectivity is used.

For each serving base station, the UE may perform RLM on a specified cell (for example, a PCell or a PSCell) based on an RLM and RLF mechanism on a PSCell.

When RLF is determined for the last serving base station of the UE (RLF has been determined for other serving base stations before), the UE performs a cell selection process during running of a timer T. If an appropriate cell is found, the UE performs an RRC connection reestablishment process. The timer T may be started when RLF is determined for the last serving base station. Duration of the timer T may be configured by a network or defined in a protocol.

Optionally, when RLF is determined for a serving base station of the UE, if there is still at least one serving base station for which no RLF has been determined, the UE reports a node RLF (regardless of whether the MN or an SN fails).

This solution can avoid that, in a related solution, a connection between UE and an NW side is interrupted when an MN PCell has encountered RLF even if signal quality of an SN PSCell is still good.

Example 2

On each node, RLM is performed based on N cells, and when the last of the N cells has encountered RLF, it is determined that the node/CG has encountered RLF.

UE is configured to work in a single/multi/dual-connectivity mode: one MN and X SNs. When X=0, single connectivity is used. When X=1, dual connectivity is used. When X>1, multi-connectivity is used.

For the MN: When RLF is determined for the last specified cell of the UE (RLF has been determined for other specified cells before), the UE performs a cell selection process during running of a timer T. If an appropriate cell is found, the UE performs an RRC connection reestablishment process.

Optionally, when RLF is determined for a specified cell of the UE, if the base station still has at least one specified cell for which no RLF has been determined, the UE reports a cell RLF.

For an SN: When RLF is determined for the last specified cell of the UE (RLF has been determined for other specified cells before), the UE reports a node RLF.

Optionally, when RLF is determined for a specified cell of the UE, if the base station still has at least one specified cell for which no RLF has been determined, the UE reports a cell RLF.

Example 3

UE is configured to work in a multi/dual-connectivity mode: one MN and X SNs. When X=1, dual connectivity is used. When X>1, multi-connectivity is used.

For each serving base station, the UE may perform RLM on N specified cells (configured by a network) based on an RLM and RLF mechanism on a PSCell.

When RLF is determined for the last specified cell of a last serving base station of the UE (RLF has been determined for all specified cells of other serving base stations and other specified cells of the base station before), the UE performs a cell selection process during running of a timer T. If an appropriate cell is found, the UE performs an RRC connection reestablishment process.

Optionally, when RLF is are for all specified cells of a serving base station of the UE, but there is still at least one serving base station having a specified cell for which no RLF has been determined, the UE reports a node RLF (regardless of whether the failed base station is the MN or an SN).

Optionally, when RLF is determined for a specified cell of a serving base station of the UE, but there is still at least one serving base station having a specified cell for which no RLF has been determined, the UE reports a cell RLF.

Example 4

A terminal is configured to report, on PUCCHs of a plurality of cells, CQI information of a specified cell on which RLM is performed.

The UE is configured with two cells (which may belong to one or more base stations) for performing RLM: a cell 1 and a cell 2.

The UE is configured to transmit CQI information of the cell 1 and the cell 2 on a PUCCH of the cell 1, and also configured to transmit the CQI information of the cell 1 and the cell 2 on a PUCCH of the cell 2.

The UE transmits the CQI information of the cell 1 and the cell 2 on the PUCCH of the cell 1, and transmits the CQI information of the cell 1 and the cell 2 on the PUCCH of the cell 2.

In this solution, the CQI information reflects downlink quality of the cells. This can avoid that the network cannot receive a CQI reported in a cell when signal quality of the cell is poor. In this solution, redundancy reporting ensures reception of the CQI information by the network, so that the network can discover downlink quality deterioration in a timely manner.

Example 5

UE is configured with SR resources or RACH resources. The SR resources or RACH resources are in a one-to-one mapping relationship or a one-to-many mapping relationship (the mapping relationship is configured by a network) with specific cells or base stations.

When the UE needs to report RLF of a cell or RLF of a node, the UE sends a corresponding SR or RACH by using an SR resource or a RACH resource corresponding to the cell or the base station.

It can be learned from the foregoing embodiments that, in some embodiments of this disclosure, a terminal (for example, UE) may at least have the following features:

The UE performs RLM based on signal quality of a plurality of cells.

For each base station, when it is determined that all specified cells corresponding to the base station have encountered RLF, it is determined that the base station has encountered RLF.

For multi-connectivity UE, when all base stations have encountered RLF, it is determined that the UE has encountered RLF, and a cell selection and reestablishment process is triggered.

For multi-connectivity UE, when all base stations except the last base station encountering RLF, have encountered RLF, the UE reports base station RLF.

For multi-connectivity UE, when an MN encounters RLF, it is determined that the UE has encountered RLF, and a cell selection and reestablishment process is triggered.

For multi-connectivity UE, when an SN encounters RLF, the UE reports base station RLF.

The UE reports CQI information of a specified cell on PUCCHs of a plurality of cells.

The UE reports cell RLF and/or node RLF by using a dedicated SR or RACH resource.

Figure 4:
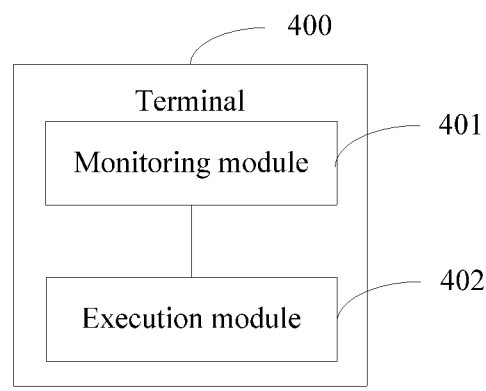
FIG. 4 is a structural diagram of a terminal according to some embodiments of this disclosure.

FIG. 4 is a structural diagram of a terminal according to some embodiments of this disclosure. As shown in FIG. 4, the terminal 400 includes:

a monitoring module 401, configured to perform RLM; and an execution module 402, configured to: when RLF is detected on a plurality of specified cells, initiate a radio link recovery procedure, and/or when RLF is detected on a specified cell, perform RLF reporting for the specified cell.

Optionally, the monitoring module 401 is configured to: when the terminal works in a dual-connectivity mode or a multi-connectivity mode, perform RLM on a specified cell of each serving base station; or the monitoring module 401 is configured to: when the terminal works in a single-connectivity mode, perform RLM on a plurality of specified cells of a serving base station.

Optionally, the monitoring module 401 is configured to: when the terminal works in the dual-connectivity mode or the multi-connectivity mode, perform RLM on one specified cell of each serving base station; or the monitoring module 401 is configured to: when the terminal works in the dual-connectivity mode or the multi-connectivity mode, perform RLM on a plurality of specified cells of each serving base station.

Optionally, the execution module 402 is configured to: when RLF is detected on specified cells of a plurality of serving base stations, initiate the radio link recovery procedure; or the execution module 402 is configured to: when RLF is detected on a plurality of specified cells of a master base station, initiate the radio link recovery procedure, where the master base station is a master base station in the dual-connectivity mode or the multi-connectivity mode, or the master base station is a serving base station in the single-connectivity mode.

Optionally, the terminal works in the dual-connectivity mode or the multi-connectivity mode, and the execution module 402 is configured to: if each serving base station has one specified cell, when RLF is detected on a plurality of specified cells, initiate the radio link recovery procedure; or the execution module 402 is configured to: if each serving base station has a plurality of specified cells, when RLF is detected on the plurality of specified cells of each serving base station, initiate the radio link recovery procedure.

Optionally, the execution module 402 is configured to: if each serving base station has one specified cell, when RLF is detected on a specified cell, report to a network side that a serving base station corresponding to the specified cell has encountered RLF; or the execution module 402 is configured to: if each serving base station has a plurality of specified cells, when RLF is detected on a first specified cell and a serving base station corresponding to the first specified cell still has a second specified cell that has not encountered RLF, report to a network side that the first specified cell has encountered RLF; or the execution module 402 is configured to: when the terminal works in the dual-connectivity mode or the multi-connectivity mode, if each serving base station has a plurality of specified cells, when RLF is detected on a plurality of specified cells of a secondary base station, report to a network side that the secondary base station has encountered RLF; or the execution module 402 is configured to: when the terminal works in the dual-connectivity mode or the multi-connectivity mode, if each serving base station has a plurality of specified cells, when RLF is detected on a plurality of specified cells of a first serving base station and there is still a second serving base station having a specified cell that has not encountered RLF, report to a network side that the first serving base station has encountered RLF; or the execution module 402 is configured to: when RLF is detected on a specified cell, report, in one or more other cells different from the specified cell, to a network side that the specified cell or a serving base station of the specified cell has encountered RLF.

Optionally, the terminal reports, to the network side by using a configured SR resource, that a specified cell or a serving base station has encountered RLF; or the terminal reports, to the network side by using a configured RACH resource, that a specified cell or a serving base station has encountered RLF.

Optionally, the terminal is configured with a mapping relationship between SR resources or RACH resources and specified cells, where one specified cell corresponds to one or more SR resources, or one specified cell corresponds to one or more RACH resources; and/or the terminal is configured with a mapping relationship between SR resources or RACH resources and serving base stations, where one serving base station corresponds to one or more SR resources, or one serving base station corresponds to one or more RACH resources; and the terminal reports, by using one or more of SR resources corresponding to a specified cell, that the specified cell has encountered RLF; or the terminal reports, by using one or more of RACH resources corresponding to a specified cell, that the specified cell has encountered RLF; or the terminal reports, by using one or more of SR resources corresponding to a serving base station, that the serving base station has encountered RLF; or the terminal reports, by using one or more of RACH resources corresponding to a serving base station, that the serving base station has encountered RLF.

Optionally, the plurality of specified cells include a specified cell corresponding to PUCCHs of a plurality of cells, and the terminal reports CQI information of the specified cell by using at least one of the PUCCHs of the plurality of cells corresponding to the specified cell.

Figure 5:
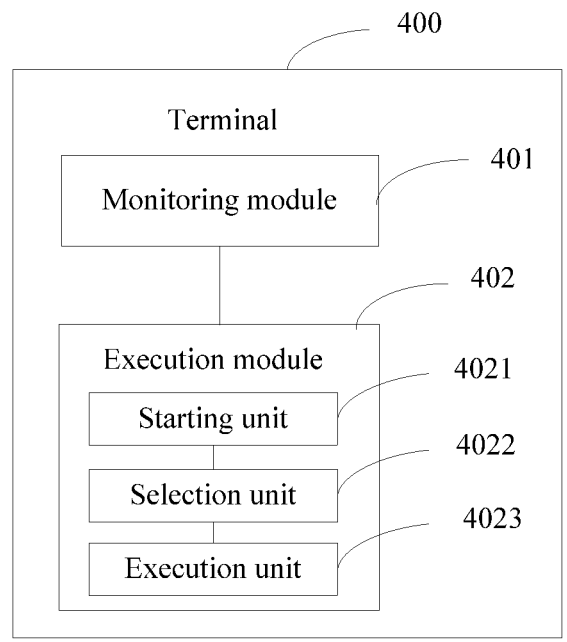
FIG. 5 is a structural diagram of another example of a terminal according to some embodiments of this disclosure.

Optionally, as shown in FIG. 5, the execution module 402 includes:

a starting unit 4021, configured to: when RLF is detected on a plurality of specified cells, start a timer;

a selection unit 4022, configured to: during running of the timer, perform a cell selection process; and an execution unit 4023, configured to: if a cell meeting a specific condition is selected, perform an RRC connection reestablishment process for the cell.

Figure 6:
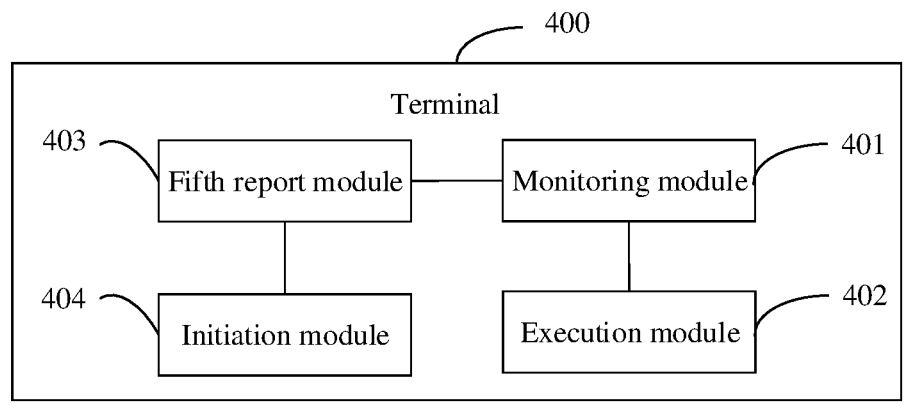
FIG. 6 is a structural diagram of another example of a terminal according to some embodiments of this disclosure.

Optionally, as shown in FIG. 6, the terminal 400 further includes:

a fifth report module 403, configured to: when a specified cell encounters beam failure, report, by using a RACH resource of another specified cell, a notification message indicating that the specified cell has encountered beam failure; and an initiation module 404, configured to: if a quantity of reporting times of reporting the notification message indicating that the specified cell has encountered beam failure reaches a preset maximum quantity of times and the reporting is still not successful, initiate the radio link recovery procedure.

Optionally, a plurality of specified cells are configured with RACH resources, and the another specified cell is a specified cell selected by the terminal from the plurality of specified cells that are configured with RACH resources.

The terminal provided in some embodiments of this disclosure can implement various processes that are implemented by the terminal in the method embodiment of this disclosure. To avoid repetition, details are not described herein again. Communication performance of the terminal can be improved.

Figure 7:
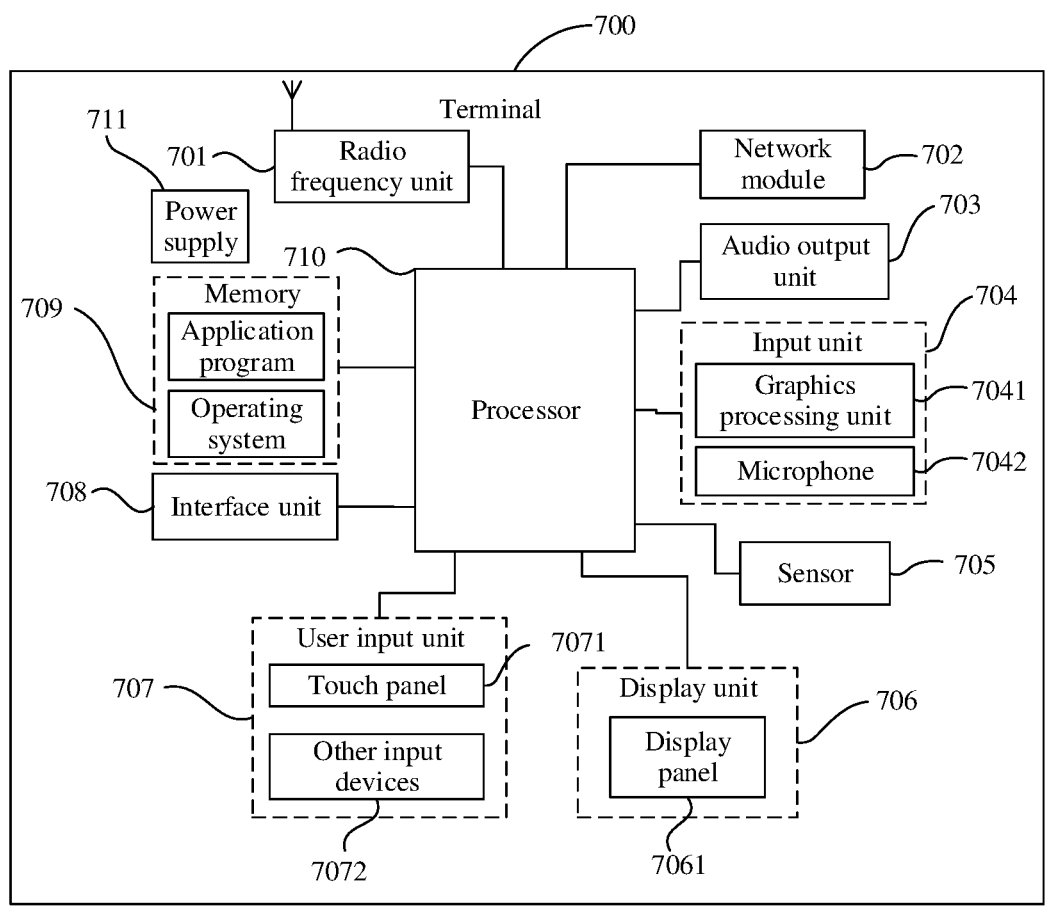
FIG. 7 is a structural diagram of another example of a terminal according to some embodiments of this disclosure.

FIG. 7 is a schematic diagram of a hardware structure of a terminal according to an embodiment of this disclosure.

The terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the terminal structure shown in FIG. 7 does not constitute a limitation to the terminal. The terminal may include more or fewer components than those shown in the figure, or some components may be combined, or there may be a different component layout. In some embodiments of this disclosure, the terminal includes but is not limited to a mobile phone, a tablet computer a notebook computer, a palmtop computer, an in-vehicle terminal, a wearable device, a pedometer, and the like.

The radio frequency unit 701 is configured to perform radio link monitoring RLM; and when radio link failure RLF is detected on a plurality of specified cells, initiating a radio link recovery procedure, and/or when RLF is detected on a specified cell, performing RLF reporting for the specified cell.

Optionally, the performing RLM by the radio frequency unit 701 includes:

when the terminal works in a dual-connectivity mode or a multi-connectivity mode, performing RLM on a specified cell of each serving base station; or when the terminal works in a single-connectivity mode, performing RLM on a plurality of specified cells of a serving base station.

Optionally, the performing RLM on a specified cell of each serving base station by the radio frequency unit 701 includes:

performing RLM on one specified cell of each serving base station; or performing RLM on a plurality of specified cells of each serving base station.

Optionally, the when RLF is detected on a plurality of specified cells, initiating a radio link recovery procedure by the radio frequency unit 701 includes:

when RLF is detected on specified cells of a plurality of serving base stations, initiating the radio link recovery procedure; or when RLF is detected on a plurality of specified cells of a master base station, initiating the radio link recovery procedure, where the master base station is a master base station in the dual-connectivity mode or the multi-connectivity mode, or the master base station is a serving base station in the single-connectivity mode.

Optionally, the terminal works in the dual-connectivity mode or the multi-connectivity mode, and the when RLF is detected on specified cells of a plurality of serving base stations, initiating the radio link recovery procedure by the radio frequency unit 701 includes:

if each serving base station has one specified cell, when RLF is detected on a plurality of specified cells, initiating the radio link recovery procedure; or if each serving base station has a plurality of specified cells, when RLF is detected on the plurality of specified cells of each serving base station, initiating the radio link recovery procedure.

Optionally, the when RLF is detected on the specified cell, performing RLF reporting for the specified cell by the radio frequency unit 701 includes:

if each serving base station has one specified cell, when RLF is detected on a specified cell, reporting to a network side that a serving base station corresponding to the specified cell has encountered RLF; or if each serving base station has a plurality of specified cells, when RLF is detected on a first specified cell and a serving base station corresponding to the first specified cell still has a second specified cell that has not encountered RLF, reporting to a network side that the first specified cell has encountered RLF; or when the terminal works in the dual-connectivity mode or the multi-connectivity mode, if each serving base station has a plurality of specified cells, when RLF is detected on a plurality of specified cells of a secondary base station, reporting to a network side that the secondary base station has encountered RLF; or when the terminal works in the dual-connectivity mode or the multi-connectivity mode, if each serving base station has a plurality of specified cells, when RLF is detected on a plurality of specified cells of a first serving base station and there is still a second serving base station having a specified cell that has not encountered RLF, reporting to a network side that the first serving base station has encountered RLF; or when RLF is detected on a specified cell, reporting, in one or more other cells different from the specified cell, to the network side that the specified cell or a serving base station of the specified cell has encountered RLF.

Optionally, the terminal reports, to the network side by using a configured scheduling request SR resource, that a specified cell or a serving base station has encountered RLF; or the terminal reports, to the network side by using a configured random access channel RACH resource, that a specified cell or a serving base station has encountered RLF.

Optionally, the terminal is configured with a mapping relationship between SR resources or RACH resources and specified cells, where one specified cell corresponds to one or more SR resources, or one specified cell corresponds to one or more RACH resources; and/or the terminal is configured with a mapping relationship between SR resources or RACH resources and serving base stations, where one serving base station corresponds to one or more SR resources, or one serving base station corresponds to one or more RACH resources; and the terminal reports, by using one or more of SR resources corresponding to a specified cell, that the specified cell has encountered RLF; or the terminal reports, by using one or more of RACH resources corresponding to a specified cell, that the specified cell has encountered RLF; or the terminal reports, by using one or more of SR resources corresponding to a serving base station, that the serving base station has encountered RLF; or the terminal reports, by using one or more of RACH resources corresponding to a serving base station, that the serving base station has encountered RLF.

Optionally, the plurality of specified cells include a specified cell corresponding to PUCCHs of a plurality of cells, and the terminal reports CQI information of the specified cell by using at least one of the PUCCHs of the plurality of cells corresponding to the specified cell.

Optionally, the when RLF is detected on a plurality of specified cells, initiating a radio link recovery procedure includes:

when RLF is detected on a plurality of specified cells, starting a timer;

during running of the timer, performing a cell selection process; and if a cell meeting a specific condition is selected, performing a radio resource control RRC connection reestablishment process for the cell.

Optionally, after the performing RLM, the method further includes:

when a specified cell encounters beam failure, reporting, by using a RACH resource of another specified cell, a notification message indicating that the specified cell has encountered beam failure; and if a quantity of reporting times of reporting the notification message indicating that the specified cell has encountered beam failure reaches a preset maximum quantity of times and the reporting is still not successful, initiating a radio link recovery procedure.

Optionally, a plurality of specified cells are configured with RACH resources, and the another specified cell is a specified cell selected by the terminal from the plurality of specified cells that are configured with RACH resources.

All the foregoing terminals can improve communication performance.

It should be understood that, in some embodiments of this disclosure, the radio frequency unit 701 may be configured to send or receive a signal in an information sending/receiving or call process. Specifically, the radio frequency unit 1501 receives downlink data from a base station and sends the downlink data to the processor 710 for processing; and sends uplink data to the base station. Usually, the radio frequency unit 701 includes but is not limited to an antenna, at least one amplifier, a transceiver, a coupler, a low noise amplifier, a duplexer, and the like. In addition, the radio frequency unit 701 may further communicate with a network and another device by using a wireless communications system.

The terminal provides the user with wireless broadband Internet access by using the network module 702, for example, helps the user send or receive an email, browse a web page, access streaming media, and the like.

The audio output unit 703 may convert audio data into an audio signal, and output the audio signal a sound, where the audio data is received by the radio frequency unit 701 or the network module 702, or is stored in the memory 709. In addition, the audio output unit 703 may further provide audio output (for example, a call signal reception tone or a message reception tone) that is related to a specific function performed by the terminal 700. The audio output unit 703 includes a loudspeaker, a buzzer, a phone receiver, and the like.

The input unit 704 is configured to receive an audio signal or a video signal. The input unit 704 may include a graphics processing unit (Graphics Processing Unit, GPU) 7041 and a microphone 7042. The graphics processing unit 7041 processes image data of a static picture or a video that is obtained by an image capture apparatus (for example, a camera) in a video capture mode or an image capture mode. A processed image frame may be displayed on the display unit 706. An image frame processed by the graphics processing unit 7041 may be stored in the memory 709 (or another storage medium), or may be sent by the radio frequency unit 701 or the network module 702. The microphone 7042 may receive a sound, and can process the sound into audio data. In a phone call mode, processed audio data may be converted, for output, into a format for transmission by the radio frequency unit 701 to a mobile communications base station.

The terminal 700 further includes at least one sensor 705, for example, an optical sensor, a motion sensor, and another sensor. Specifically, the optical sensor includes an ambient light sensor and a proximity sensor. The ambient light sensor may adjust brightness of a display panel 7061 based on intensity of ambient light. When the terminal 700 moves near an ear, the proximity sensor may disable the display panel 7061 and/or backlight. As a motion sensor, an accelerometer sensor may detect for a value of an acceleration in various directions (there are usually three axes), may detect for a value and a direction of gravity when the terminal is still, and may be configured to recognize a posture of the terminal (for example, landscape/portrait mode switching, a related game, or magnetometer posture calibration), provide a function related to vibration recognition (for example, a pedometer or a keystroke), or the like. The sensor 705 may further include a fingerprint sensor, a pressure sensor, an iris sensor, a molecular sensor, a gyroscope, a barometer, a hygrometer, a thermometer, or an infrared sensor. Details are not described herein.

The display unit 706 is configured to display information entered by the user or information provided for the user. The display unit 706 may include the display panel 7061. Optionally, the display panel 7061 may be configured in a form of a liquid crystal display (Liquid Crystal Display, LCD), an organic light-emitting diode (Organic Light-Emitting Diode, OLED), or the like.

The user input unit 707 may be configured to receive entered numerical or character information, and generate key signal input that is related to a user setting and function control of the terminal. Specifically, the user input unit 707 includes a touch panel 7071 and another input device 7072. The touch panel 7071 is also referred to as a touchscreen, and may collect a touch operation of the user on or near the touch panel (for example, an operation performed on or near the touch panel 7071 by the user by using any appropriate object or accessory such as a finger or a stylus). The touch panel 7071 may include two parts: a touch detection apparatus and a touch controller. The touch detection apparatus detects for a touch orientation of the user, detects for a signal brought by the touch operation, and transmits the signal to the touch controller. The touch controller receives touch information from the touch detection apparatus, converts the touch information into contact coordinates, sends the contact coordinates to the processor 710, receives a command sent by the processor 710, and executes the command In addition, the touch panel 7071 may be implemented in a plurality of types, for example, a resistive type, a capacitive type, an infrared type, and a surface acoustic wave. In addition to the touch panel 7071, the user input unit 707 may further include the another input device 7072. Specifically, the another input device 7072 may include but is not limited to a physical keyboard, a function key (for example, a volume control key or a power on/off key), a track ball, a mouse, and a joystick. Details are not described herein.

Further, the touch panel 7071 may cover the display panel 7061. After detecting a touch operation on or near the touch panel 7071, the touch panel 15071 transmits the touch operation to the processor 710 to determine a type of a touch event. Then the processor 710 provides corresponding visual output on the display panel 7061 based on the type of the touch event. In FIG. 7, the touch panel 7071 and the display panel 7061 serve as two independent components to implement input and output functions of the terminal. However, in some embodiments, the touch panel 7071 and the display panel 7061 may be integrated to implement the input and output functions of the terminal. This is not specifically limited herein.

The interface unit 708 is an interface for connecting an external apparatus to the terminal 700. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, or a headset port. The interface unit 708 may be configured to receive input (for example, data information and electric power) from the external apparatus, and transmit the received input to one or more elements in the terminal 700; or may be configured to transmit data between the terminal 700 and the external apparatus.

The memory 709 may be configured to store software programs and various types of data. The memory 709 may mainly include a program storage region and a data storage region. The program storage region may store an operating system, an application program required by at least one function (for example, an audio play function or an image play function), and the like. The data storage region may store data (for example, audio data and a phone book) created based on usage of the mobile phone. In addition, the memory 709 may include a high-speed random access memory, or may include a nonvolatile memory, for example, at least one magnetic disk storage device or a flash memory device, or another volatile solid-state storage device.

The processor 710 is a control center of the terminal, connects various parts of the entire terminal by using various interfaces and lines, and executes various functions and data processing of the terminal by running or executing a software program and/or a module stored in the memory 709 and invoking data stored in the memory 709, so as to perform overall monitoring on the terminal. The processor 710 may include one or more processing units. Optionally, the processor 710 may integrate an application processor and a modem processor. The application processor mainly processes an operating system, a user interface, an application program, and the like. The modem processor mainly processes wireless communication. It may be understood that the modem processor may be alternatively not integrated in the processor 710.

The terminal 700 may further include a power supply 711 (for example, a battery) that supplies power to each component. Optionally, the power supply 711 may be logically connected to the processor 710 by using a power management system, so as to implement functions such as charging management, discharging management, and power consumption management by using the power management system.

In addition, the terminal 700 may include some functional modules that are not shown. Details are not described herein.

Optionally, some embodiments of this disclosure further provide a terminal, including: a processor 710, a memory 709, and a computer program that is stored in the memory 709 and is capable of running on the processor 710. When the computer program is executed by the processor 710, processes in the foregoing embodiments of the radio link recovery method are implemented, and a same technical effect can be achieved. To avoid repetition, details are not described herein again.

Some embodiments of this disclosure further provide a computer-readable storage medium. The computer-readable storage medium stores a computer program, and when the computer program is executed by a processor, processes in the embodiments of the radio link recovery method provided in some embodiments of this disclosure are implemented, and a same technical effect can be achieved. To avoid repetition, details are not described herein again. For example, the computer-readable storage medium is a read-only memory (Read-Only Memory, ROM for short), a random access memory (Random Access Memory, RAM for short), a magnetic disc, an optical disk, or the like.

The computer-readable storage medium in this disclosure may be a volatile computer-readable storage medium or a non-volatile computer-readable storage medium.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such a process, method, article, or apparatus. In absence of more constraints, an element preceded by "includes a . . . " does not preclude the existence of other identical elements in the process, method, article, or apparatus that includes the element.

Based on the foregoing descriptions of the implementations, a person skilled in the art may clearly understand that the method in the foregoing embodiments may be implemented by software and a necessary general-purpose hardware platform, or certainly, may be implemented by hardware. In many cases, the implementation by using the software and the necessary general-purpose hardware platform is a better implementation. Based on such an understanding, the technical solutions of this disclosure essentially, or a part contributing to the prior art may be implemented in a form of a software product. The computer software product is stored in a storage medium (for example, a ROM/RAM, a magnetic disc, or an optical disk), and includes several instructions for instructing a terminal (which may be a mobile phone, a computer, a server, an air conditioner, a network device, or the like) to perform the methods described in the embodiments of this disclosure.

The foregoing describes the embodiments of this disclosure with reference to the accompanying drawings. However, this disclosure is not limited to the foregoing specific implementations. The foregoing specific implementations are merely examples, and do not constitute a limitation. Inspired by this disclosure, a person of ordinary skill in the art can make many variations without departing from the essence of this disclosure or the protection scope of the claims. All these variations shall fall within the protection scope of this disclosure.

What is claimed is:

1. A radio link recovery method, wherein the method is applied to a terminal and comprises:
   performing radio link monitoring (RLM); and
   when radio link failure (RLF) is detected on a plurality of specified cells, initiating a radio link recovery procedure, and when RLF is detected on a specified cell, performing RLF reporting for the specified cell;
   wherein the performing RLF reporting for the specified cell when RLF is detected on a specified cell comprises:
   if each serving base station has one specified cell, when RLF is detected on a specified cell, reporting to a network side that a serving base station corresponding to the specified cell has encountered RLF; or
   if each serving base station has a plurality of specified cells, when RLF is detected on a first specified cell and a serving base station corresponding to the first specified cell still has a second specified cell that has not encountered RLF, reporting to a network side that the first specified cell has encountered RLF; or
   when the terminal works in the dual-connectivity mode or the multi-connectivity mode, if each serving base station has a plurality of specified cells, when RLF is detected on a plurality of specified cells of a secondary base station, reporting to a network side that the secondary base station has encountered RLF; or
   when the terminal works in the dual-connectivity mode or the multi-connectivity mode, if each serving base station has a plurality of specified cells, when RLF is detected on a plurality of specified cells of a first serving base station and there is still a second serving base station having a specified cell that has not encountered RLF, reporting to a network side that the first serving base station has encountered RLF; or
   when RLF is detected on a specified cell, reporting, in one or more other cells different from the specified cell, to the network side that the specified cell or a serving base station of the specified cell has encountered RLF;
   wherein the terminal reports, to the network side by using a configured random access channel RACH resource, that a specified cell or a serving base station has encountered RLF; wherein the terminal is configured with a mapping relationship between RACH resources and specified cells, one specified cell corresponds to one or more RACH resources, and the terminal reports, by using one or more of RACH resources corresponding to a specified cell, that the specified cell has encountered RLF.

2. The method according to claim 1, wherein the performing RLM comprises:
   when the terminal works in a dual-connectivity mode or a multi-connectivity mode, performing RLM on a specified cell of each serving base station; or
   when the terminal works in a single-connectivity mode, performing RLM on a plurality of specified cells of a serving base station.

3. The method according to claim 2, wherein the performing RLM on a specified cell of each serving base station comprises:
performing RLM on one specified cell of each serving base station; or
performing RLM on a plurality of specified cells of each serving base station.

4. The method according to claim 2, wherein the when RLF is detected on a plurality of specified cells, initiating a radio link recovery procedure comprises:
when RLF is detected on specified cells of a plurality of serving base stations, initiating the radio link recovery procedure; or
when RLF is detected on a plurality of specified cells of a master base station, initiating the radio link recovery procedure, wherein the master base station is a master base station in the dual-connectivity mode or the multi-connectivity mode, or the master base station is a serving base station in the single-connectivity mode.

5. The method according to claim 4, wherein the terminal works in the dual-connectivity mode or the multi-connectivity mode, and the when RLF is detected on specified cells of a plurality of serving base stations, initiating the radio link recovery procedure comprises:
if each serving base station has one specified cell, when RLF is detected on a plurality of specified cells, initiating the radio link recovery procedure; or
if each serving base station has a plurality of specified cells, when RLF is detected on the plurality of specified cells of each serving base station, initiating the radio link recovery procedure.

6. The method according to claim 1, wherein the terminal reports, to the network side by using a configured scheduling request SR resource, that a specified cell or a serving base station has encountered RLF, the terminal is configured with a mapping relationship between SR resources and specified cells, wherein one specified cell corresponds to one or more SR resources; and/or the terminal is configured with a mapping relationship between SR resources or RACH resources and serving base stations, wherein one serving base station corresponds to one or more SR resources, or one serving base station corresponds to one or more RACH resources; and
the terminal reports, by using one or more of SR resources corresponding to a specified cell, that the specified cell has encountered RLF; or
the terminal reports, by using one or more of SR resources corresponding to a serving base station, that the serving base station has encountered RLF; or
the terminal reports, by using one or more of RACH resources corresponding to a serving base station, that the serving base station has encountered RLF.

7. The method according to claim 1, wherein the plurality of specified cells comprise a specified cell corresponding to physical uplink control channels PUCCHs of a plurality of cells, and the terminal reports channel quality indicator CQI information of the specified cell by using at least one of the PUCCHs of the plurality of cells corresponding to the specified cell.

8. The method according to claim 1, wherein the when RLF is detected on a plurality of specified cells, initiating a radio link recovery procedure comprises:
when RLF is detected on a plurality of specified cells, starting a timer;
during running of the timer, performing a cell selection process; and
if a cell meeting a specific condition is selected, performing a radio resource control RRC connection reestablishment process for the cell.

9. The method according to claim 1, wherein after the performing RLM, the method further comprises:
when a specified cell encounters beam failure, reporting, by using a RACH resource of another specified cell, a notification message indicating that the specified cell has encountered beam failure; and
if a quantity of reporting times of reporting the notification message indicating that the specified cell has encountered beam failure reaches a preset maximum quantity of times and the reporting is still not successful, initiating a radio link recovery procedure.

10. The method according to claim 9, wherein a plurality of specified cells are configured with RACH resources, and the another specified cell is a specified cell selected by the terminal from the plurality of specified cells that are configured with RACH resources.

11. A terminal, comprising:
a memory, a processor, and a computer program that is stored in the memory and capable of running on the processor, wherein the computer program is executed by the processor to implement a radio link recovery method, comprising:
performing radio link monitoring RLM; and
when radio link failure RLF is detected on a plurality of specified cells, initiating a radio link recovery procedure, and when RLF is detected on a specified cell, performing RLF reporting for the specified cell;
wherein the performing RLF reporting for the specified cell when RLF is detected on a specified cell comprises:
if each serving base station has one specified cell, when RLF is detected on a specified cell, reporting to a network side that a serving base station corresponding to the specified cell has encountered RLF; or
if each serving base station has a plurality of specified cells, when RLF is detected on a first specified cell and a serving base station corresponding to the first specified cell still has a second specified cell that has not encountered RLF, reporting to a network side that the first specified cell has encountered RLF; or
when the terminal works in the dual-connectivity mode or the multi-connectivity mode, if each serving base station has a plurality of specified cells, when RLF is detected on a plurality of specified cells of a secondary base station, reporting to a network side that the secondary base station has encountered RLF; or
when the terminal works in the dual-connectivity mode or the multi-connectivity mode, if each serving base station has a plurality of specified cells, when RLF is detected on a plurality of specified cells of a first serving base station and there is still a second serving base station having a specified cell that has not encountered RLF, reporting to a network side that the first serving base station has encountered RLF; or
when RLF is detected on a specified cell, reporting, in one or more other cells different from the specified cell, to the network side that the specified cell or a serving base station of the specified cell has encountered RLF;
wherein the terminal reports, to the network side by using a configured random access channel RACH resource, that a specified cell or a serving base station has encountered RLF; wherein the terminal is configured with a mapping relationship between RACH resources and specified cells, one specified cell corresponds to one or more RACH resources, and the terminal reports, by using one or more of RACH resources corresponding to a specified cell, that the specified cell has encountered RLF.

12. The terminal according to claim 11, wherein the performing RLM comprises:
when the terminal works in a dual-connectivity mode or a multi-connectivity mode, performing RLM on a specified cell of each serving base station; or
when the terminal works in a single-connectivity mode, performing RLM on a plurality of specified cells of a serving base station.

13. The terminal according to claim 12, wherein the performing RLM on a specified cell of each serving base station comprises:
performing RLM on one specified cell of each serving base station; or
performing RLM on a plurality of specified cells of each serving base station; and/or
wherein the when RLF is detected on a plurality of specified cells, initiating a radio link recovery procedure comprises:
when RLF is detected on specified cells of a plurality of serving base stations, initiating the radio link recovery procedure; or
when RLF is detected on a plurality of specified cells of a master base station, initiating the radio link recovery procedure, wherein the master base station is a master base station in the dual-connectivity mode or the multi-connectivity mode, or the master base station is a serving base station in the single-connectivity mode.

14. The terminal according to claim 13, wherein the terminal works in the dual-connectivity mode or the multi-connectivity mode, and the when RLF is detected on specified cells of a plurality of serving base stations, initiating the radio link recovery procedure comprises:
if each serving base station has one specified cell, when RLF is detected on a plurality of specified cells, initiating the radio link recovery procedure; or
if each serving base station has a plurality of specified cells, when RLF is detected on the plurality of specified cells of each serving base station, initiating the radio link recovery procedure.

15. The terminal according to claim 11, wherein the terminal reports, to the network side by using a configured scheduling request SR resource, that a specified cell or a serving base station has encountered RLF, the terminal is configured with a mapping relationship between SR resources and specified cells, wherein one specified cell corresponds to one or more SR resources; and/or the terminal is configured with a mapping relationship between SR resources or RACH resources and serving base stations, wherein one serving base station corresponds to one or more SR resources, or one serving base station corresponds to one or more RACH resources; and
the terminal reports, by using one or more of SR resources corresponding to a specified cell, that the specified cell has encountered RLF; or
the terminal reports, by using one or more of SR resources corresponding to a serving base station, that the serving base station has encountered RLF; or
the terminal reports, by using one or more of RACH resources corresponding to a serving base station, that the serving base station has encountered RLF.

16. A non-transitory computer-readable storage medium, wherein the computer-readable storage medium stores a computer program, and the computer program is executed by a processor to implement a radio link recovery method applied to a terminal, comprising:
performing radio link monitoring RLM; and
when radio link failure RLF is detected on a plurality of specified cells, initiating a radio link recovery procedure, and when RLF is detected on a specified cell, performing RLF reporting for the specified cell;
wherein the performing RLF reporting for the specified cell when RLF is detected on a specified cell comprises:
if each serving base station has one specified cell, when RLF is detected on a specified cell, reporting to a network side that a serving base station corresponding to the specified cell has encountered RLF; or
if each serving base station has a plurality of specified cells, when RLF is detected on a first specified cell and a serving base station corresponding to the first specified cell still has a second specified cell that has not encountered RLF, reporting to a network side that the first specified cell has encountered RLF; or
when the terminal works in the dual-connectivity mode or the multi-connectivity mode, if each serving base station has a plurality of specified cells, when RLF is detected on a plurality of specified cells of a secondary base station, reporting to a network side that the secondary base station has encountered RLF; or
when the terminal works in the dual-connectivity mode or the multi-connectivity mode, if each serving base station has a plurality of specified cells, when RLF is detected on a plurality of specified cells of a first serving base station and there is still a second serving base station having a specified cell that has not encountered RLF, reporting to a network side that the first serving base station has encountered RLF; or
when RLF is detected on a specified cell, reporting, in one or more other cells different from the specified cell, to the network side that the specified cell or a serving base station of the specified cell has encountered RLF;
wherein the terminal reports, to the network side by using a configured random access channel RACH resource, that a specified cell or a serving base station has encountered RLF; wherein the terminal is configured with a mapping relationship between RACH resources and specified cells, one specified cell corresponds to one or more RACH resources, and the terminal reports, by using one or more of RACH resources corresponding to a specified cell, that the specified cell has encountered RLF.

17. The non-transitory computer-readable storage medium according to claim 16, wherein the terminal reports, to the network side by using a configured scheduling request SR resource, that a specified cell or a serving base station has encountered RLF, the terminal is configured with a mapping relationship between SR resources and specified cells, wherein one specified cell corresponds to one or more SR resources; and/or
the terminal is configured with a mapping relationship between SR resources or RACH resources and serving base stations, wherein one serving base station corresponds to one or more SR resources, or one serving base station corresponds to one or more RACH resources; and
the terminal reports, by using one or more of SR resources corresponding to a specified cell, that the specified cell has encountered RLF; or the terminal reports, by using one or more of SR resources corresponding to a serving base station, that the serving base station has encountered RLF; or the terminal reports, by using one or more of RACH resources corresponding to a serving base station, that the serving base station has encountered RLF.

18. The non-transitory computer-readable storage medium according to claim 16, wherein the plurality of specified cells comprise a specified cell corresponding to physical uplink control channels PUCCHs of a plurality of cells, and the terminal reports channel quality indicator CQI information of the specified cell by using at least one of the PUCCHs of the plurality of cells corresponding to the specified cell.

19. The non-transitory computer-readable storage medium according to claim 16, wherein the when RLF is detected on a plurality of specified cells, initiating a radio link recovery procedure comprises:

when RLF is detected on a plurality of specified cells, starting a timer;

during running of the timer, performing a cell selection process; and if a cell meeting a specific condition is selected, performing a radio resource control RRC connection reestablishment process for the cell.

20. The non-transitory computer-readable storage medium according to claim 16, wherein after the performing RLM, the method further comprises:

when a specified cell encounters beam failure, reporting, by using a RACH resource of another specified cell, a notification message indicating that the specified cell has encountered beam failure; and if a quantity of reporting times of reporting the notification message indicating that the specified cell has encountered beam failure reaches a preset maximum quantity of times and the reporting is still not successful, initiating a radio link recovery procedure.

\* \* \* \* \*